US010215881B2

(12) United States Patent
Zhou et al.

(10) Patent No.: US 10,215,881 B2
(45) Date of Patent: Feb. 26, 2019

(54) SYSTEMS AND METHODS TO DIFFERENTIATE ELEMENTS LOCATED AT DIFFERENT DISTANCES USING NEUTRON-INDUCED GAMMA-RAY SPECTROSCOPY AND THE DOPPLER EFFECT

(71) Applicant: Schlumberger Technology Corporation, Sugar Land, TX (US)

(72) Inventors: Tong Zhou, Sugar Land, TX (US); Jeffrey Miles, Arlington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/645,153

(22) Filed: Jul. 10, 2017

(65) Prior Publication Data
US 2019/0011598 A1 Jan. 10, 2019

(51) Int. Cl.
*G01V 5/04* (2006.01)
*G01V 5/10* (2006.01)
*E21B 49/00* (2006.01)

(52) U.S. Cl.
CPC .............. *G01V 5/102* (2013.01); *E21B 49/00* (2013.01)

(58) Field of Classification Search
CPC .......... G01N 23/20066; G01V 5/0025; G01V 5/0069; G01V 5/145; E21B 29/02; E21B 33/1204; E21B 49/00; E21B 43/11
(Continued)

(56) References Cited

U.S. PATENT DOCUMENTS 3,171,961 A * 3/1965 Yule .......................... G01V 5/12
250/269.3
3,515,871 A * 6/1970 Johnson, Jr. ........... G01V 5/145
250/269.3
(Continued)

FOREIGN PATENT DOCUMENTS

WO 2012162473 A2 11/2012

OTHER PUBLICATIONS

Radtke, R.J., Lorente, M., Adolph, R., Berheide, M., Fricke S., Grau, J., Herron, S., Horkowitz, J., Jorion, B., Madio, D., May, D., Miles, J., Philip, O., Roscoe, B., Rose, D., Stoller, C., 2012, A new capture and inelastic spectroscopy tool takes geochemical logging to the next level, Paper 103, Transactions, SPWLA 53rd Annual Logging Symposium, Cartagena, Colombia, Jun. 16-20.
(Continued)

*Primary Examiner* — Taeho Jo
(74) *Attorney, Agent, or Firm* — Michael Dae

(57) ABSTRACT

Systems and methods are provided for distinguishing between elements located at different distances from a radiation detector used in neutron-induced gamma-ray spectroscopy using a Doppler effect. A pulsed neutron generator may emit neutrons out of a downhole tool in a geological formation at an energy level high enough to cause inelastic scattering with nuclei of an element to generate gamma-rays. A gamma-ray detector may detect the energy levels of the gamma-rays, in the reference frame of the detector, and data processing circuitry takes the detected spectrum of gamma-rays and distinguishes spectra of gamma-ray energy levels for nuclei of the element located nearer to or farther from the detector based at least in part on the Doppler shift of the energy levels of respective gamma-rays.

20 Claims, 6 Drawing Sheets

(58) Field of Classification Search
USPC .................................................. 250/269.6
See application file for complete search history.

(56) References Cited

U.S. PATENT DOCUMENTS

| | | | | |
|---|---|---|---|---|
| 3,780,294 | A * | 12/1973 | Sowerby | G01N 23/095 250/364 |
| 5,808,298 | A | 9/1998 | Mickael | |
| 6,484,051 | B1 * | 11/2002 | Daniel | G01N 23/20 250/363.03 |
| 8,963,073 | B2 * | 2/2015 | Grau | G01V 5/101 250/269.6 |
| 9,575,208 | B2 | 2/2017 | Grau et al. | |
| 9,746,582 | B1 | 8/2017 | Zhou | |
| 2009/0074142 | A1 * | 3/2009 | Bertozzi | G01N 23/20066 378/88 |
| 2009/0213993 | A1 * | 8/2009 | Bertozzi | G01N 23/223 378/86 |
| 2009/0272906 | A1 * | 11/2009 | Gratton | G01T 3/00 250/370.05 |
| 2014/0241505 | A1 * | 8/2014 | Xu | G01N 23/20066 378/87 |
| 2015/0185358 | A1 * | 7/2015 | Stoller | G01V 5/101 250/269.6 |
| 2015/0285944 | A1 * | 10/2015 | Herron | G01N 33/246 250/269.6 |
| 2016/0195636 | A1 * | 7/2016 | Grau | G01V 5/104 250/269.2 |
| 2016/0370494 | A1 * | 12/2016 | Zhou | G01T 1/17 |

OTHER PUBLICATIONS

Rose, D., Zhou, T., Beekman, S., Quinlan, T., Delgadillo, M., Gonzalez, G., Fricke, S., Thornton, J., Clinton, D., Gicquel, F., Shestakova, I., Stephenson, K., Stoller, C., Philip, O., La Rotta Marin, J., Mainier, S., Perchonok, B., and Bailly, J.-P., 2015, An innovative slim pulsed neutron logging tool, Paper XXXX, Transactions, SPWLA 56th Annual Logging Symposium, Long Beach, California, USA, Jul. 18-22.

J. A. Grau, J. S. Schweitzer, "Elemental Concentrations from Thermal Neutron Capture Gamma-ray Spectra in Geological Formations", Nucl. Geophys. vol. 3, No. 1, pp. 1-9, 1989, Int. J. Radiat. Appl. Instrum. Part E.

Karus E.V. et al., "Nuclear Geophysics in Prospecting, Exploration and Development of Oil and Gas Fields", International Journal of Applied Radiation and Isotops, Pergamon Press, New York, NY, US, vol. 34, No. 1, Jan. 1, 1983, pp. 95-118.

Extended Search Report issued in the related EP Application EP 18182664.5, dated Dec. 13, 2018 (6 pages).

* cited by examiner

SYSTEMS AND METHODS TO DIFFERENTIATE ELEMENTS LOCATED AT DIFFERENT DISTANCES USING NEUTRON-INDUCED GAMMA-RAY SPECTROSCOPY AND THE DOPPLER EFFECT

BACKGROUND

This disclosure relates to using neutron-induced gamma-ray spectroscopy to distinguish between nuclei of an element (e.g., carbon) located nearer to a detector of a downhole tool from nuclei of the element (e.g., carbon) located farther from the detector of the downhole tool in the well.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Producing hydrocarbons from a wellbore drilled into a geological formation is a remarkably complex endeavor. In many cases, decisions involved in hydrocarbon exploration and production may be informed by measurements from downhole well-logging tools that are conveyed deep into the wellbore. The measurements may be used to infer properties and characteristics of the geological formation surrounding the wellbore. The discovery and observation of resources using downhole techniques generally takes place down in the wellbore with sensors. These sensors may be a part of a tool-string that may be attached to a drill or other downhole device.

One particular type of sensor uses a method of direct carbon measurement using neutron-induced gamma-ray spectroscopy. This method may be used to estimate the prolificacy of oil or other carbon-based resource of interest in the area. This technique may include a neutron source and one or more gamma-ray detectors. In general, this technique is practiced by emitting high-energy neutrons into the environment and detecting gamma-ray radiation from the surrounding carbon nuclei. The high-energy neutrons emitted into the environment may collide with and/or scatter off a carbon nucleus, thus causing gamma-ray emission of a certain energy. These gamma-rays may then be detected and the information processed to reveal the carbon in the environment.

The method of neutron-induced gamma-ray spectroscopy may, however, be subject to inaccuracies due to the carbon in the wellbore itself. Carbon in the wellbore, such as oil or oil-based mud, may appear in the same signal measuring the carbon in the surrounding geological formation. Because the wellbore carbon and the carbon in the geological formation are measured at the same time, it may be difficult to accurately estimate the amount of carbon in a reservoir in the geological formation, thus causing inaccuracy in the resource's volume estimate.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To better enhance the measurement of particular elements (e.g., carbon) in the geological formation based on neutron-induced gamma-ray spectroscopy, a subtle Doppler effect may be identified from the neutron-induced gamma-ray spectroscopy signal. The Doppler effect causes the energy level of emitted waves (e.g., photons, sound, water) to be shifted due to the relative velocity of the emitting object (e.g., carbon nucleus). When the waves are emitted in the same direction as the velocity of the object relative to some observer (e.g., detector), the waves are observed as having a higher energy level than if the object had been stationary relative to the observer. Conversely, when the waves are emitted in the opposite direction of the velocity of the object relative to some observer (e.g., detector), the waves are observed as having a lower energy level than if the object had been stationary relative to the observer. In the context of neutron-induced gamma-ray spectroscopy, the Doppler effect may produce a subtle, but measureable, shift in a peak corresponding to certain elements (e.g., carbon) in the neutron-induced gamma-ray spectroscopy signal based on the way that the elements were impacted by a neutron emitted by a downhole tool.

In particular, since neutrons are emitted out from the downhole tool by a neutron source located away from a gamma-ray detector, the neutrons will impact elements that are closer to the detector at a different angle relative to the detector than that of elements that are farther from the detector. Thus, the impacted elements will emit neutron-induced gamma-rays that can be detected at energies shifted by slightly different amounts due to the Doppler effect, depending on the angle of impact in relation to the detector. This means that neutron-induced gamma-rays produced by interactions between the emitted neutrons and elements closer to the detector may have measured energies that are slightly different (namely, higher) than neutron-induced gamma-rays produced by interactions between the emitted neutrons and elements farther from the detector. Thus, by separating components of a neutron-induced gamma-ray spectroscopy signal based on the Doppler effect on the signal, a relative amount of an element (e.g., carbon) that is nearer to the detector of a downhole tool may be distinguished from the element (e.g., carbon) that is farther from the detector of the downhole tool.

Indeed, in one example, a method of differentiating relative amounts of an element that is nearer or further from the detector may begin with placing a downhole tool into a wellbore in a geological formation. The downhole tool may then emit neutrons to cause inelastic scattering events that generate photons. By detecting spectra of the photons using the downhole tool, distinguishing between a first spectrum of the spectra of the photons that are likely to have originated closer to the downhole tool and a second spectrum of the spectra of the photons that are likely to have originated farther from the downhole tool may be accomplished based at least in part on Doppler broadening of the spectra. This may result in determining a property of the geological formation using the first spectrum, the second spectrum, or both.

In another embodiment, a system utilizing a pulsed neutron generator emits neutrons out of a downhole tool may be used to distinguish relative amounts of an element that are nearer or further from the detector. In a geological formation, the downhole tool emits neutrons at an energy level high enough to cause inelastic scattering with nuclei of an element to generate gamma-rays. A gamma-ray detector records the detected gamma-rays and the associated energy of each. Data processing circuitry may then distinguishes between a first spectrum of gamma-ray energy levels and a second spectrum of gamma-ray energy levels. The first spectrum and the second spectrum are differentiated based at least in part on the Doppler shift of the energy levels of respective gamma-rays. The first spectrum denotes gamma-rays that originated closer to the downhole tool and the second spectrum denotes gamma-rays that originated farther from the downhole tool. The data processing circuitry may then determine a property of the geological formation using the first spectrum, the second spectrum, or both.

In another embodiment, an article of manufacture including one or more tangible, non-transitory, machine readable media includes instructions to distinguish relative amounts of an element that are nearer or further from the detector. These instructions may include receiving gamma-ray spectra obtained by a downhole tool in a wellbore in a geological formation and due at least in part to inelastic scattering events between neutrons emitted by the downhole tool and nuclei of an element. The instructions may then include distinguishing between a first spectrum of the spectra of the photons that are likely to have originated closer to the downhole tool and a second spectrum of the spectra of the gamma-rays that are likely to have originated farther from the downhole tool based at least in part on Doppler broadening of the spectra. Then, a property of the geological formation may be determined using the first spectrum, the second spectrum, or both.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
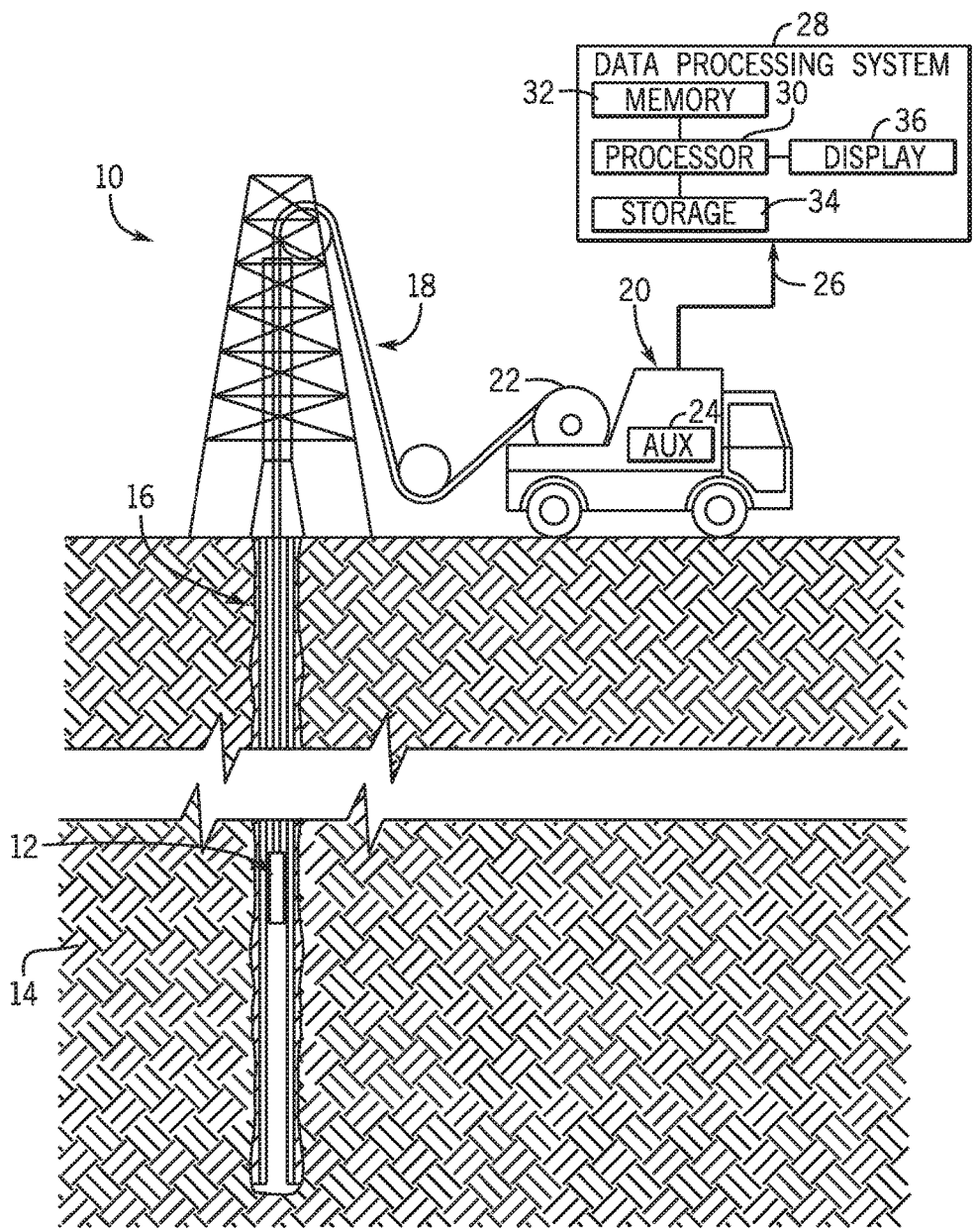
FIG. 1 is an example of a neutron-induced gamma-ray spectroscopy system, in accordance with an embodiment.

One or more specific embodiments of the present disclosure will be described below. These described embodiments are examples of the presently disclosed techniques. Additionally, in an effort to provide a concise description of these embodiments, the features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The oil and gas industry includes a number of sub-industries, such as exploration, drilling, logging, extraction, transportation, refinement, retail, and so forth. During exploration and drilling, wellbores may be drilled into the ground for reasons that may include discovery, observation, or extraction of resources. These resources may include oil, gas, water, or any other combination of elements within the ground.

Wellbores, sometimes called boreholes, may be straight or curved holes drilled into the ground from which resources may be discovered, observed, or extracted. During and/or after the formation of a wellbore, well logging may be practiced. Well logging may include making a detailed record of the geological formations penetrated by a wellbore, and is generally part of the discovery and observation of resources.

The exploration of what lies beneath the ground may be accomplished by a number of methods including surface and downhole techniques. The discovery and observation of resources using downhole techniques generally takes place down in the wellbore with sensors. These sensors may be a part of a tool-string that may be attached to a drill or other downhole device.

One particular type of sensor uses a method of direct carbon measurement using neutron-induced inelastic gamma-ray spectroscopy. This method may be used to estimate the prolificacy of oil or other carbon based resource of interest in the area. This technique may include a neutron source and one or more gamma-ray detectors. In general, this technique is practiced by emitting high-energy neutrons into the environment and detecting gamma-ray radiation from the surrounding carbon nuclei. The high-energy neutrons emitted into the environment may collide with and/or scatter off a carbon nucleus thus causing gamma-ray emission of a certain energy. These gamma-rays may then be detected and the information processed to reveal the carbon in the environment.

The method of neutron-induced inelastic gamma-ray spectroscopy may, however, be subject to inaccuracies due to the carbon in the wellbore itself. Carbon in the wellbore, such as oil or oil-based mud, may cause detection that is difficult to separate from detection of carbon in the surrounding formation, thus causing inaccuracy in the resource's volume estimate. To better enhance the measurement of particular elements (e.g., carbon) in the geological formation based on neutron-induced gamma-ray spectroscopy, a subtle Doppler effect may be identified from the neutron-induced gamma-ray spectroscopy signal. The Doppler effect causes the energy level of emitted waves (e.g., photons, sound, water) to be shifted due to the relative velocity of the emitting object (e.g., carbon nucleus). When the waves are emitted in the same direction as the velocity of the object relative to some observer (e.g., detector), the waves are observed as having a higher energy level than if the object had been stationary relative to the observer. Conversely, when the waves are emitted in the opposite direction of the velocity of the object relative to some observer (e.g., detector), the waves are observed as having a lower energy level than if the object had been stationary relative to the observer. In the context of neutron-induced gamma-ray spectroscopy, the Doppler effect may produce a subtle, but measureable, shift in a peak corresponding to certain elements (e.g., carbon) in the neutron-induced gamma-ray spectroscopy signal based on the way that the elements were impacted by a neutron emitted by a downhole tool.

In particular, since neutrons are emitted out from the downhole tool by a neutron source located away from a gamma-ray detector, the neutrons will impact elements that are closer to the detector at a different angle relative to the detector than that of elements that are farther from the detector. Thus, the impacted elements will emit neutron-induced gamma-rays at energies that are shifted by a slightly different amount due to the Doppler effect depending on the angle of impact in relation to the detector. This means that neutron-induced gamma-rays produced by interactions between the emitted neutrons and elements closer to the detector may have measured energies that are slightly different (namely, higher) than neutron-induced gamma-rays produced by interactions between the emitted neutrons and elements farther from the detector. Thus, by separating components of a neutron-induced gamma-ray spectroscopy signal based on the Doppler effect on the signal, a relative amount of an element (e.g., carbon) that is nearer to the detector of a downhole tool may be distinguished from the element (e.g., carbon) that is farther from the detector of the downhole tool.

With the foregoing mind, FIG. 1 illustrates a well-logging system 10 that may employ the systems and methods of this disclosure. The well-logging system 10 may be used to convey a downhole tool 12 through a geological formation 14 via a wellbore 16. In the example of FIG. 1, the downhole tool 12 is conveyed on a cable 18 via a logging winch system (e.g., vehicle) 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Moreover, while the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable downhole tool that uses neutron-induced inelastic gamma-ray spectroscopy within the wellbore 16 (e.g., downhole environment).

As discussed further below, the downhole tool 12 may receive energy from an electrical energy device or an electrical energy storage device, such as the auxiliary power source 24 or another electrical energy source to power the tool. Additionally, in some embodiments the downhole tool 12 may include a power source within the downhole tool 12, such as a battery system or a capacitor to store sufficient electrical energy to activate the neutron emitter and record gamma-ray radiation.

Control signals 26 may be transmitted from a data processing system 28 to the downhole tool 12, and data signals 26 related to the spectroscopy results may be returned to the data processing system 28 from the downhole tool 12. The data processing system 28 may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be read-only memory (ROM), random-access memory (RAM), flash memory, an optical storage medium, or a hard disk drive, to name a few examples. A display 36, which may be any suitable electronic display, may display images generated by the processor 30. The data processing system 28 may be a local component of the logging winch system 20 (e.g., within the downhole tool 12), a remote device that analyzes data from other logging winch systems 20, a device located proximate to the drilling operation, or any combination thereof. In some embodiments, the data processing system 28 may be a mobile computing device (e.g., tablet, smart phone, or laptop) or a server remote from the logging winch system 20.

Figure 2:
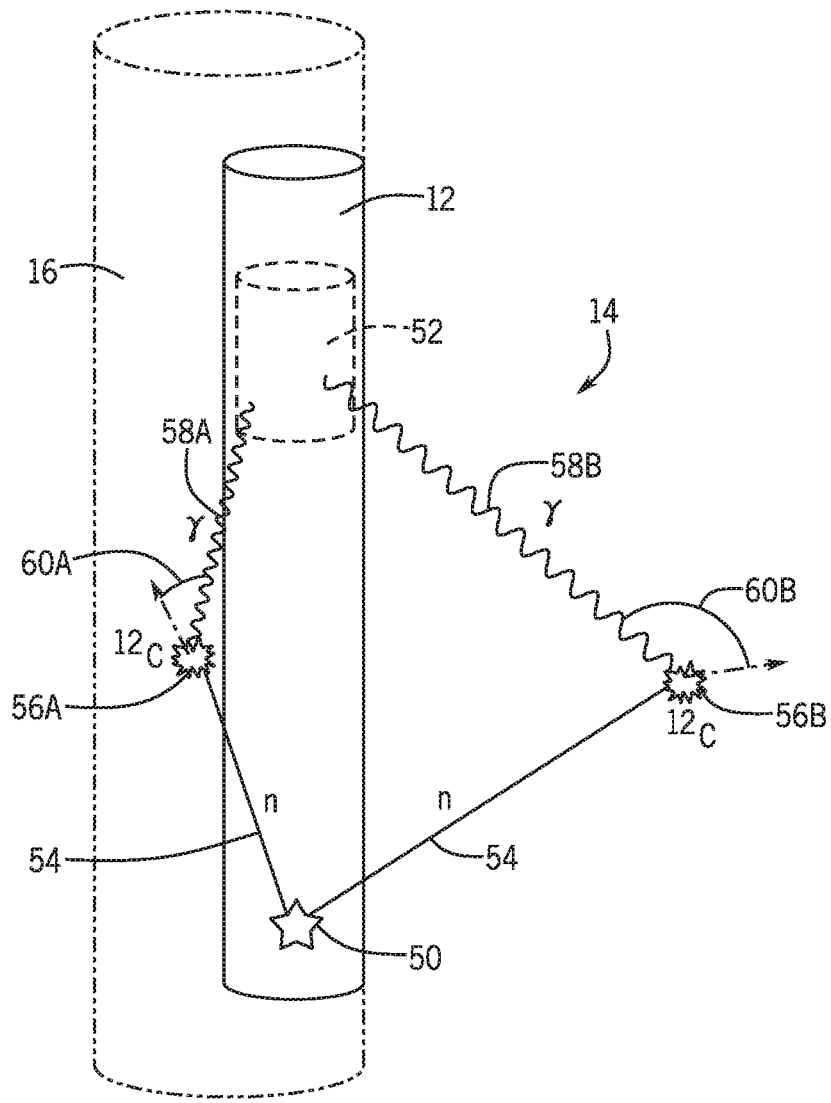
FIG. 2 is an example of a neutron-induced gamma-ray spectroscopy downhole tool, in accordance with an embodiment.

The downhole tool 12, as depicted in FIG. 2, includes a neutron source 50 and a gamma-ray detector 52. The neutron source 50 may be any type of neutron generator (e.g., pulsed neutron generator) or radioisotopic material (e.g., AmBe) that produces high-energy neutrons and is suitable for downhole operations. When placed into the wellbore 16 and activated, the neutron source 50 may emit high-energy neutrons 54 into the surrounding formation 14 in every direction. These high-energy neutrons 54 interact with nuclei 56A and 56B (e.g., carbon nuclei) in the surrounding area in events including, but not limited to, inelastic scattering, elastic scattering, and neutron capture. During an inelastic scattering collision, the neutron 54 hits a nucleus 56 A or 56B causing the emission of a photon (e.g., gamma-ray 58A or 58B). Each gamma-ray 58 A or 58B that is detected by the detector 52 is counted in a bin with an associated energy range. The count rates of different energies may then be viewed as a spectrum of energies with associated counts for each energy level.

In downhole operations, hydrocarbons make up the majority of compounds of interest, being the base compounds of oil and gas. Therefore, carbon is an element of substantial interest that may signify the presence and/or magnitude of oil and gas reservoirs. In the present disclosure, carbon nuclei 56 A and 56B are thus described as the element of interest for the inelastic scattering events. However, it should be appreciated that the techniques of this disclosure may apply to other elements (such as oxygen) that may be present in a downhole environment.

When a high-energy neutron 54 and a carbon nuclei 56A or 56B have an inelastic collision, a gamma-ray 58A or 58B of a specific energy level is emitted. This mono-energetic level, about 4.43 MeV, allows for the distinction of carbon from other elements in the environment and other background radiation in the spectrum of energies. Thus, the spectrum of energies can be used to estimate the carbon component of the geological formation 14, and thus may be used to obtain an oil volume estimation. However, the estimation may be skewed by carbon components in the wellbore 16 itself (e.g., oil and oil-based mud). Therefore, differentiating wellbore carbon 56A from formation carbon 56B may provide more accurate and/or precise measurements that can lead to a more accurate and/or precise oil volume estimation. The present disclosure relates that the Doppler effect induced on the gamma-rays by recoiling carbon nuclei 56A and 56B is an avenue for distinguishing wellbore carbon 56A and formation carbon 56B.

The Doppler effect causes the energy level of emitted waves (e.g., photons, sound, water) to be shifted due to the relative velocity of the emitting object (e.g., carbon nucleus). When the waves are emitted in the same direction as the velocity of the object relative to some observer (e.g., detector), the waves are observed as having a higher energy level than if the object had been stationary relative to the observer. Conversely, when the waves are emitted in the opposite direction of the velocity of the object relative to some observer (e.g., detector), the waves are observed as having a lower energy level than if the object had been stationary relative to the observer. For a gamma-ray 58 to be observed by a detector 52 however, the gamma-ray 58 must actually hit the detector 52. Therefore, an angle 60 is made between the detector 52 and the recoiling carbon nucleus 56A or 56B that may describe in what manner the Doppler effect is shifting the energy of the gamma-ray 58A or 58B.

As described above, as each wellbore carbon nucleus 56A recoils from a collision with a neutron 54, the direction it travels makes a particular angle 60A with respect to the detector 52, and each formation carbon nucleus 56B recoils from a collision with a particular angle 60B relative to the detector 52. Since the carbon nuclei 56A and 56B are more likely to recoil in the direction in which the neutron 54 was traveling prior to collision, the angles made between the recoiling nuclei 56A and the detector 52 that are close to the detector 52 are likely to be smaller angles than the angles formed from recoiling nuclei 56B that are further from the detector 52. Therefore, gamma-rays 58A originating near the downhole tool 12, for example in the wellbore 16, the angle 60A that the recoiling wellbore carbon nucleus 56A makes with the detector 52 is likely to be smaller than the angle 60B that the recoiling formation carbon nucleus 56B makes with the detector 52 because the formation carbon nucleus is further away. In the aggregate, this causes gamma-rays 58A from wellbore carbon nuclei 56A to have a higher energies than gamma-rays 58B from formation carbon 56B.

A wide spectrum of energies may be detected by the detector 52. Using any suitable gamma-ray spectroscopy, the energy peaks and/or unique characteristic shapes of standard spectra of the elements that can generate inelastic gamma-rays 58A and 58B can be used to obtain relative yields for each element from the wider spectrum of energies. By recognizing the Doppler effect in the gamma-rays 58A and 58B from recoiling carbon nuclei 56A and 56B, another peak can be added to the spectral analysis for the carbon nuclei 56A found in the wellbore 16. Using the relative yield of the formation carbon 56B while taking into account wellbore carbon 56A, more accurate estimates may be made about properties of the geological formation 14. With a higher-fidelity sampling of energies and/or statistical noise reduction, peaks and spectra may be created for a number of distances away from the tool 12, which may lead to further accurate estimates. Indeed, while much of the present disclosure focuses on gamma-rays 58A and 58B of two distances—such as wellbore gamma-rays 56A and formation gamma-rays 56B—any suitable number of ranges of different distances (e.g., in concentric spheres around the detector 52) may be used.

Figure 3:
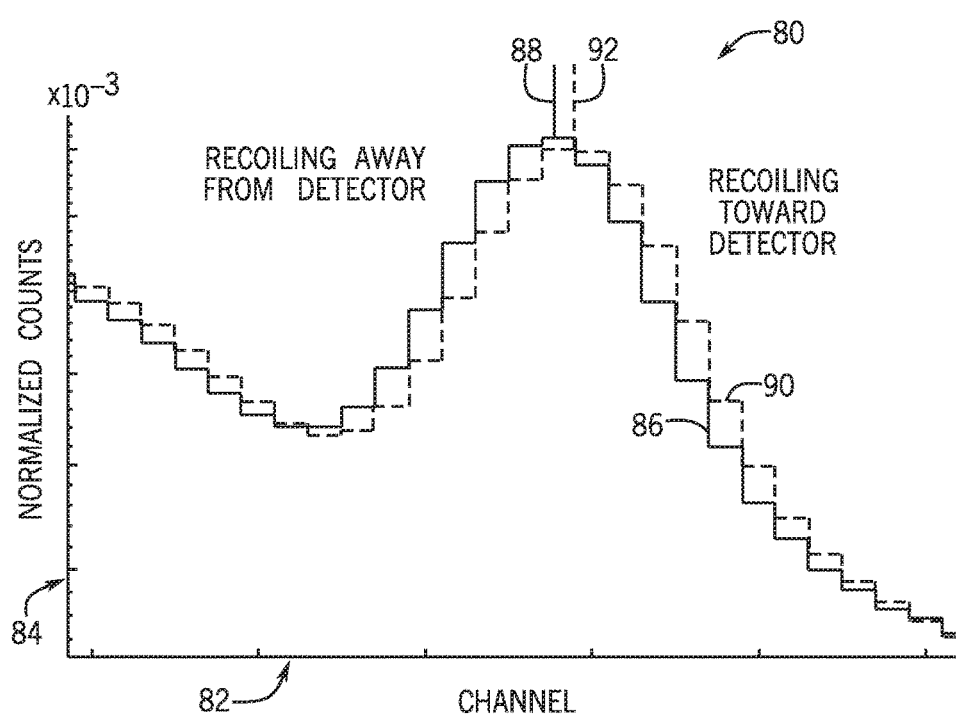
FIG. 3 is a plot of a neutron-induced gamma-ray spectroscopy measurement including carbon detected nearer to a detector of the downhole tool and carbon detected farther from the detector of the downhole tool, in accordance with an embodiment.

The spectra 80 of wellbore carbon 56A and formation carbon 56B, zoomed in on the main carbon peak, may be extrapolated from the wider spectrum of energies as shown in FIG. 3, where a horizontal axis 82 denotes the energy level by channel and a vertical axis 84 denotes the normalized counts at the individual energy levels. A formation carbon spectrum 86 is based on the standard spectrum for carbon and may have a peak 88 the same as the standard carbon spectrum. An additional wellbore carbon spectrum 90 is a higher-energy spectrum due to the Doppler effect, and has a peak 92 with a relatively higher energy. The Doppler shift between the formation spectra 86, where the carbon nuclei 56B recoil away from the detector 52, and the wellbore spectra 90, where the carbon nuclei 56A recoil more towards the detector 52, and the associated shift in energy peaks may be approximated by a gain shift. In FIG. 3, a 0.3% gain shift separates the two spectra. That is, the wellbore peak 92 is 1.003 times the energy of the formation peak 88.

To aid in the approximation of the Doppler shift the neutron emissions 54 could be focused in a known direction or their direction calculated by other means. Additionally, the gamma-ray detectors 52 could be setup in such a way to determine, either by direct detection or by a statistical aggregate, the direction from which the gamma-rays 58A and 58B are originating. The Doppler shift between the energy peaks could also be inferred by restricting the presence of carbon to certain exclusive zones (e.g. the wellbore or formation) as in separate laboratory experiments. As someone skilled in the art would appreciate, this may assist in the calculation of the Doppler effect on the gamma-rays, and could yield results of higher accuracy.

Figure 4:
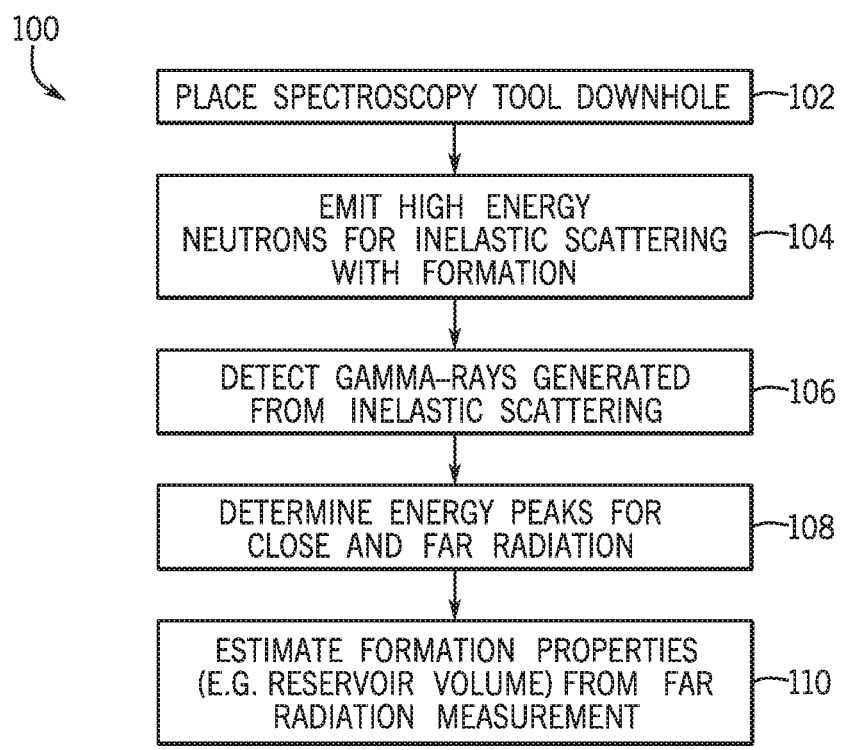
FIG. 4 is a flowchart illustrating a method for estimating formation properties, in accordance with an embodiment.

A general process 100 for using the tool 12 and making estimations formation estimates is depicted in FIG. 4. Once the tool 12 is placed downhole (process block 102), the high-energy neutrons 54 are emitted into the geological formation 14 and collide with carbon nuclei 56A and 56B in inelastic scattering events (process block 104). Gamma-ray emissions 58A and 58B are created by the inelastic scattering events, and detected by a detector 52 (process block 106). From the spectrum of energies detected, the energy peak 88 for carbon nuclei 56B farther from the tool 12 and the energy peak 92 for carbon nuclei 56A close to the tool 12, modified by a gain due to the Doppler effect, may be extrapolated (process block 108). From the relative yield of carbon nuclei 56B further from the tool 12, formation properties such as reservoir volume may be estimated using any suitable spectroscopy techniques (process block 110).

To obtain a useful relative yield, additional observances may be taken into account. A number of factors, for example geometry, current well production, tool position, cement thickness, hole size, casing size, casing weight, and standoff, can alter the results of the spectra. Accounting for these factors may be done by a composition (e.g., linear combination, Monte Carlo modeling) of the apparent yields for wellbore carbon 56A and formation carbon 56B. For example, a linear combination of the yields for wellbore carbon 56A and formation carbon 56B with the coefficients depending on the wellbore conditions. However, simple linear combinations can lead to statistical noise because of the anti-correlation between the apparent formation carbon yield and the apparent wellbore formation carbon yield.

Figure 5:
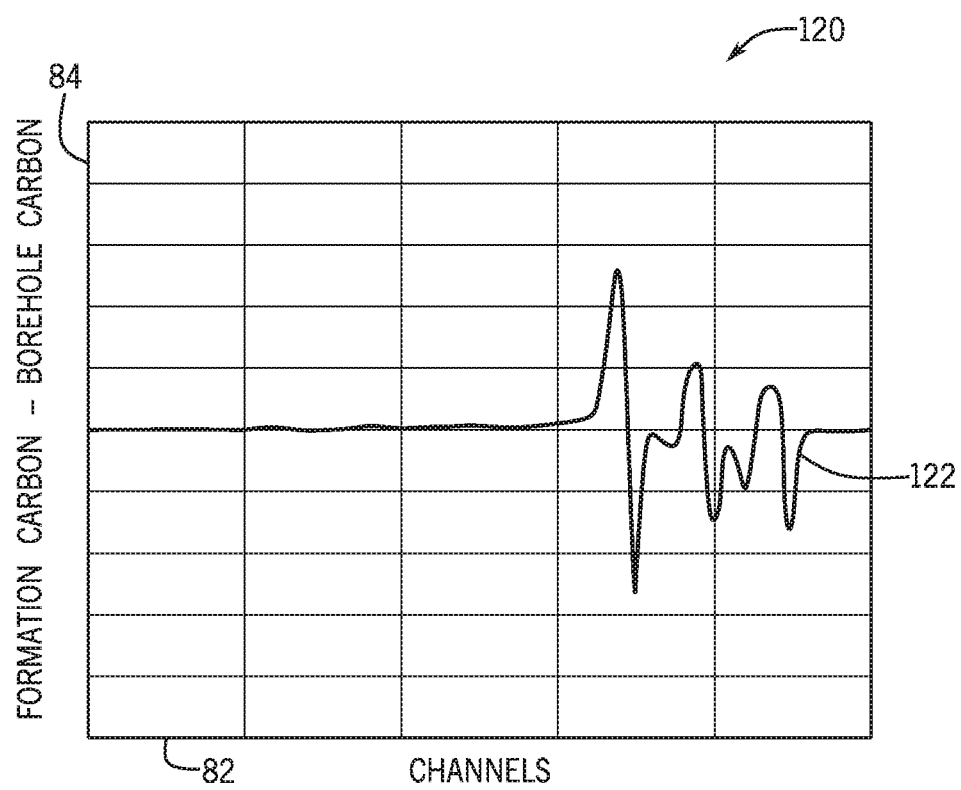
FIG. 5 is a plot of the difference of the two gamma-ray spectra of FIG. 3, in accordance with an embodiment.

To help combat statistical noise is another composition which includes a linear combination of the apparent formation carbon yield and a weighted linear combination of the apparent formation carbon yield and the apparent wellbore carbon yield. In such a case, the standard spectrum corresponding to the weighted linear combination may be shown in a spectrum 120, as shown in FIG. 5, where the horizontal axis 82 denotes the energy level by channel and the vertical axis 84 denotes the normalized counts at the individual energy levels. This spectrum 120 depicts a difference 122 between the formation carbon spectra 86 and the wellbore carbon spectra 90 over the full range of measured energies. The difference 122 may be substituted for the wellbore carbon spectra 90 in determining apparent yields. The corresponding apparent yields may then be used in a linear combination where the coefficients depend on the wellbore conditions to get a corrected formation carbon yield. The apparent formation carbon yield and apparent wellbore carbon yield will then have very little statistical correlation, and the effect of a linear combination of the two may have less statistical noise.

In addition to the Doppler effect, the spectra 80 from the two general regions of the formation and wellbore will also be affected by gamma-ray scattering. Every measured spectrum is affected by scattering and attenuation of the original emitted gamma-rays 58, which causes them to lose energy (or to be lost altogether). Gamma-rays 58 detected from wellbore carbon 56A tend to undergo less scattering than gamma-rays detected from formation carbon 56B. This occurs because the wellbore fluid is usually less dense than the formation rock, and because the wellbore gamma-rays 56A often have less distance to travel to get to the detector than do the formation gamma-rays 56B. The result is that when an element such as carbon has a spectrum coming from both the wellbore 16 and the geological formation 14, the formation carbon spectrum 86 is often enhanced at lower energies due to its additional down-scattering.

Figure 6:
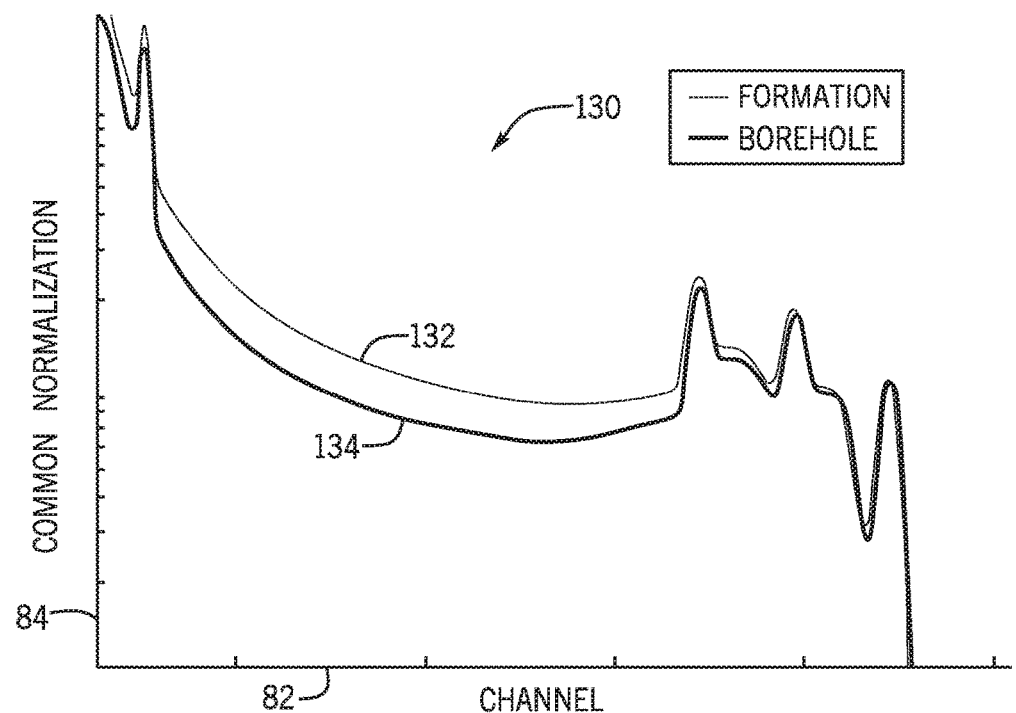
FIG. 6 is a normalized plot of neutron induced gamma-ray energy levels including carbon detected nearer to a detector of the downhole tool and carbon detected farther from the detector of the downhole tool with the effects of Doppler shift and scattering taken into account, in accordance with an embodiment.
Figure 7:
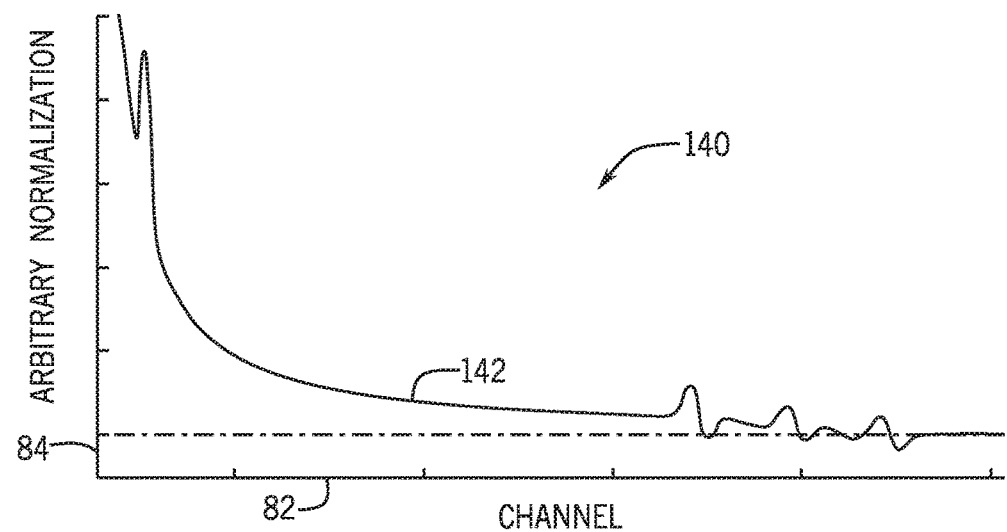
FIG. 7 is a plot of the difference of the two gamma-ray spectra of FIG. 6, in accordance with an embodiment.

The combination of scattering effects and the Doppler effect on gamma-rays can be modeled by a spectra 130 of FIG. 6, where the horizontal axis 82 denotes the energy level by channel and the vertical axis 84 denotes the normalized counts at the individual energy levels. Such spectra 130 may be calculated using the Doppler effect spectra 80 of this disclosure with known techniques to adjust the scattering via Monte Carlo modeling (e.g. the method of "scattering functions") or other model-based methods. Such spectra 130 can also be computed as a linear combination of direct experimental measurements. A combined formation spectrum 132 and a combined wellbore spectrum 134 use both the Doppler effect and scattering effects on the gamma-rays. Another graph 140 can be created to define a combined difference spectrum 142 as shown in FIG. 7, where the horizontal axis 82 denotes the energy level by channel and the vertical axis 84 denotes the normalized counts at the individual energy levels. The combined difference spectrum 142 may be used to reduce the degradation of statistical precision in the spectral fit, as described previously. A corrected combined formation yield may be obtained using a linear combination of the combined formation yield and the combined difference yield.

Accordingly, the technical effects of the present disclosure allow for the determination of nuclei being near or far from a downhole tool 12 based on the Doppler effect on gamma-rays emitted from interactions with emitted neutrons, such as inelastic scattering events. This determination allows for further increased accuracy and precision of carbon yields in the geological formation 14. Additionally or alternatively, using both the Doppler effect and gamma-ray scattering to distinguish between nearer and farther elements may produce an even more precise and/or accurate value of a corrected combined formation yield. The corrected combined formation yield may be used to estimate formation properties, for example oil reservoir volume, to a higher precision and/or accuracy.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A method comprising:
   placing a downhole tool into a wellbore in a geological formation;
   emitting neutrons out of the downhole tool to cause inelastic scattering events that generate photons;
   detecting spectra of the photons using the downhole tool;
   distinguishing between a first spectrum of the spectra of the photons that are likely to have originated closer to the downhole tool and a second spectrum of the spectra of the photons that are likely to have originated farther from the downhole tool based at least in part on Doppler broadening of the spectra; and
   determining a property of the geological formation using the first spectrum, the second spectrum, or both.

2. The method of claim 1, wherein the first spectrum has a first peak with a higher energy and the second spectrum has a second peak with a lower energy.

3. The method of claim 2, wherein the spectra comprises a third spectrum of photons that are likely to have originated farther from the downhole tool than the photons of the second spectrum and has a third peak with a lower energy than the second peak of the second spectrum.

4. The method of claim 1, wherein the first spectrum has a first peak and the second spectrum has a second peak, wherein the first peak and the second peak are due at least in part to inelastic scattering events between neutrons and nuclei of a first element.

5. The method of claim 4, wherein the first element is carbon.

6. The method of claim 4, wherein the first element is oxygen.

7. The method of claim 4, wherein the first spectrum has a third peak and the second spectrum has a fourth peak, wherein the third peak and the fourth peak are due at least in part to inelastic scattering events between neutrons and nuclei of a second element.

8. The method of claim 1, wherein the first spectrum and the second spectrum are distinguished based at least in part on the scattering of the photons.

9. The method of claim 1, wherein a first relative yield is determined from the first spectrum and a second relative yield is determined from the second spectrum.

10. The method of claim 9, wherein the determination of the property of the geological formation is due at least in part by a linear combination of the first relative yield, the second relative yield, and/or the difference between the first relative yield and the second relative yield.

11. The method of claim 1, wherein the first spectrum has a first peak and the second spectrum has a second peak, and wherein the first peak can be computed by a gain shift of the second peak.

12. A system comprising:
a pulsed neutron generator configured to emit neutrons out of a downhole tool in a geological formation at an energy level high enough to cause inelastic scattering with nuclei of a first element to generate gamma-rays;
a gamma-ray detector configured to detect energy levels of the gamma-rays; and
data processing circuitry configured to distinguish between a first spectrum of gamma-ray energy levels and a second spectrum of gamma-ray energy levels, wherein the first spectrum and the second spectrum are differentiated based at least in part on the Doppler shift of the energy levels of respective gamma-rays, wherein the first spectrum denotes gamma-rays that originated closer to the downhole tool and the second spectrum denotes gamma-rays that originated farther from the downhole tool, and wherein the data processing circuitry determines a property of the geological formation using the first spectrum, the second spectrum, or both.

13. The system of claim 12, wherein the first spectrum has a first peak and the second spectrum has a second peak, wherein the first peak and the second peak are due at least in part to a inelastic scattering events between neutrons and nuclei of a first element.

14. The system of claim 13, wherein the first element is carbon.

15. The system of claim 12, wherein the first spectrum and the second spectrum are distinguished by the data processing circuitry based at least in part on the scattering of the gamma-rays.

16. An article of manufacture comprising one or more tangible, non-transitory, machine readable media comprising instructions to:
receive gamma-ray spectra obtained by a downhole tool in a wellbore in a geological formation, wherein the gamma-ray spectra are due at least in part to inelastic scattering events between neutrons emitted by the downhole tool and nuclei of a first element;
distinguish between a first spectrum of the spectra of the photons that are likely to have originated closer to the downhole tool and a second spectrum of the spectra of the gamma-rays that are likely to have originated farther from the downhole tool based at least in part on Doppler broadening of the spectra; and
determine a property of the geological formation using the first spectrum, the second spectrum, or both.

17. The article of claim 16, wherein the first spectrum has a first peak and the second spectrum has a second peak, wherein the first peak and the second peak are due at least in part to a inelastic scattering events between neutrons and nuclei of a first element.

18. The article of claim 17, wherein the first element is carbon.

19. The article of claim 16, wherein the first spectrum and the second spectrum are distinguished based at least in part on the scattering of the gamma-rays.

20. The article of claim 16, wherein the first spectrum has a first peak and the second spectrum has a second peak, and wherein the first peak can be computed by a gain shift of the second peak.

\* \* \* \* \*